(12) United States Patent
Mutairi et al.

(10) Patent No.: US 12,181,418 B2
(45) Date of Patent: Dec. 31, 2024

(54) SYSTEM AND METHOD FOR IN-SITU PROBING OF A CONDUIT

(71) Applicant: SAUDI ARABIAN OIL COMPANY, Dhahran (SA)

(72) Inventors: Saad Menahi Mutairi, Dhahran (SA); Damian Pablo San Roman Alerigi, Dhahran (SA); Sameeh Issa Batarseh, Dhahran Hills (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 247 days.

(21) Appl. No.: 18/050,346

(22) Filed: Oct. 27, 2022

(65) Prior Publication Data
US 2024/0142383 A1  May 2, 2024

(51) Int. Cl.
*G01N 21/85* (2006.01)
*F17D 3/01* (2006.01)
(Continued)

(52) U.S. Cl.
CPC .............. *G01N 21/85* (2013.01); *F17D 3/01* (2013.01); *G01N 21/05* (2013.01); *G01N 21/55* (2013.01);
(Continued)

(58) Field of Classification Search
CPC .. F17D 3/01; F17D 3/10; G01N 21/55; G01N 21/05; G01N 21/85; G01N 2201/0227;
(Continued)

(56) References Cited

U.S. PATENT DOCUMENTS

| 3,784,234 A | 1/1974 | Mohr |
| 4,001,543 A | 1/1977 | Bove et al. |

(Continued)

FOREIGN PATENT DOCUMENTS

| CN | 110653492 A | 1/2020 |
| CN | 211840594 U | 11/2020 |

(Continued)

OTHER PUBLICATIONS

International Search Report and Written Opinion issued in corresponding International Application No. PCT/US2023/077918, dated Feb. 20, 2024 (10 pages).

(Continued)

*Primary Examiner* — Sang H Nguyen
(74) *Attorney, Agent, or Firm* — Osha Bergman Watanabe & Burton LLP

(57) ABSTRACT

A device for probing an interior of a tube includes an annular frame configured for engagement with a rotor or an orbital element mount. The annular frame presents a mounting surface. An annular buffer layer is positioned radially inward of and concentrically with the annular frame. A flexible annular sealing layer is joined with the annular buffer layer and positioned radially inward of and concentrically with the annular buffer layer. The sealing layer is configured to form a seal with the tube. A rotational layer is positioned between the annular frame and the buffer layer enabling rotation of the annular frame about the annular buffer layer. A process cartridge frame is mounted on the mounting surface and includes three or more process cartridge openings. Each of the cartridge openings is configured to receive a process cartridge. Each process cartridge is rotatively selectable via rotation of the annular frame.

20 Claims, 6 Drawing Sheets

(51) Int. Cl.
*G01N 21/05* (2006.01)
*G01N 21/55* (2014.01)
*G01N 21/15* (2006.01)

(52) U.S. Cl.
CPC . *G01N 2021/052* (2013.01); *G01N 2021/151* (2013.01); *G01N 2201/0227* (2013.01)

(58) Field of Classification Search
CPC ....... G01N 2021/052; G01N 2021/151; B23K 26/282; B23K 26/60; B23K 26/70; B23K 26/211; B23K 13/01; B23K 2101/10
See application file for complete search history.

(56) References Cited

U.S. PATENT DOCUMENTS

| | | | |
|---|---|---|---|
| 5,593,605 | A | 1/1997 | Jones |
| 6,335,508 | B1 | 1/2002 | Nam |
| 7,135,870 | B2 | 11/2006 | Mohajer et al. |
| 10,099,319 | B2 | 10/2018 | Kocks et al. |
| 10,124,433 | B2 | 11/2018 | Schmid et al. |
| 10,254,499 | B1 * | 4/2019 | Cohen ................... B29C 64/321 |
| 2007/0119829 | A1 | 5/2007 | Vietz et al. |
| 2016/0228993 | A1 * | 8/2016 | Grausgruber ............ C21D 9/50 |
| 2017/0080519 | A1 * | 3/2017 | Atin ..................... B23K 20/123 |
| 2017/0368586 | A1 | 12/2017 | Schenk et al. |
| 2018/0221984 | A1 | 8/2018 | Toguyeni |
| 2020/0338668 | A1 | 10/2020 | Calzavara et al. |
| 2021/0381353 | A1 * | 12/2021 | Al-Harbi ................... E21B 7/15 |

FOREIGN PATENT DOCUMENTS

| | | |
|---|---|---|
| CN | 110315220 B | 12/2020 |
| CN | 110285328 B | 3/2021 |
| CN | 110977155 B | 6/2021 |
| CN | 110052706 B | 7/2021 |
| CN | 217032627 U | 7/2022 |
| DE | 3617865 A1 | 12/1987 |
| GB | 2547688 A | 8/2017 |

OTHER PUBLICATIONS

Webtestex, "Pipeline Inspection Tools", YouTube, published Mar. 3, 2016, Website: https://www.youtube.com/watch?v=fY7sW25fMWQ.

Tech Insider, "This inflatable robot snake could help with search and rescue missions", YouTube, published Jul. 26, 2017, Website: https://www.youtube.com/watch?v=YsnHfN5AqKE.

* cited by examiner

SYSTEM AND METHOD FOR IN-SITU PROBING OF A CONDUIT

BACKGROUND

Conduits designed to carry fluids from one location to another are used in a variety of applications, for example, oil and gas pipelines, water and sewage piping, among other applications. Because of the importance of many of the applications in which such conduits are implemented, monitoring and maintenance of the conduits as well as flow characteristics of the fluids flowing within may be considered important by many companies.

Once a conduit has been put into place, obtaining information regarding a condition of an internal portion of the conduit or even flow information regarding a fluid flowing through the conduit can be difficult. This may be particularly true where older systems of conduit were implemented prior to availability of certain technologies enabling some internal conditions or where cost constraints for a project prohibit implementations of such technologies.

In typical scenarios, inspection and maintenance of fluid carrying conduits involves piercing an orifice in the conduit for probe insertion, subsequent inspection and characterization, and then closing of the pierced orifice. The process can be time consuming and can result in both production losses and flaws in the closing that may be cause for future outages of the conduit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present inventors have recognized that conventional maintenance and inspection techniques can be costly and time consuming, and therefore detrimental to overall operation of a conduit.

In one aspect, embodiments disclosed herein relate to a device for probing an interior of a tube. The device includes an annular frame configured for engagement with a rotor or an orbital element mount, the annular frame presenting a mounting surface on a face of the annular frame, an annular buffer layer positioned radially inward of and concentrically with the annular frame, a flexible annular sealing layer joined with the annular buffer layer and positioned radially inward of and concentrically with the annular buffer layer, wherein the flexible annular sealing layer is configured to form a seal with the tube, a rotational layer positioned between the annular frame and the annular buffer layer enabling rotation of the annular frame about the annular buffer layer; and a process cartridge frame mounted on the mounting surface and comprising three or more process cartridge openings, wherein each of the three or more process cartridge openings is configured to receive a process cartridge, wherein each process cartridge is rotatively selectable via rotation of the annular frame.

The flexible annular sealing member may include an expandable substrate forming a base of the flexible annular sealing layer, wherein the base is joined with the annular buffer layer, and the expandable substrate may be configured to be expanded to cause deformation of the flexible annular sealing layer against a surface of the tube.

The device may further include a first process cartridge corresponding to a piercing cartridge mounted in a first process cartridge opening of the three or more process cartridge openings, a second process cartridge corresponding to a probing cartridge mounted in second process cartridge opening of the three or more process cartridge openings, and a third process cartridge corresponding to a closing cartridge mounted in a third process cartridge opening of the three or more process cartridge openings.

Each of the first, second, and third process cartridges may be operable independently of another of the first, second, and third process cartridges.

The piercing cartridge may include a laser piercing tool configured to pierce the tube to produce a probing orifice, the probing cartridge may be configured to introduce a probe into the tube via the probing orifice, the probe may be configured to provide information related to an interior of the tube, and the closing cartridge may be configured to close the probing orifice via a welding or a cladding process after removal of the probe.

The device may further include a gas supply and at least one nozzle configured to purge a working area between the tube and one or more of the first, second, and third process cartridges.

The device may further include a controller configured to control one or more of rotation of the annular frame, selection of a process cartridge, and operation of the selected process cartridge.

The flexible annular sealing layer may include a material selected from among a high-temperature elastomer, a flexible thermoplastic, and a shape memory polymer, the material having a thermal expansion less than 0.01 mm/degree K and a thermal conductivity between 0.03 and 0.1 W/mK.

The material may include an anisotropic composite or plastic, the material being embedded with fiber reinforcement.

The rotation layer may include one or more of a bearing set and a fluid joint.

The buffer layer may include a rigid material configured to isolate rotation of the annular frame from the flexible sealing layer.

The buffer layer may include one or more fluid lines configured to carry a fluid to an output nozzle associated with a process cartridge opening.

The piercing cartridge may include a fluid fiber assembly configured to transmit a processing beam having a first frequency to an exterior surface of the tube, and the fluid fiber assembly may include a fluid reservoir, a fluid pump, a nozzle, and one or more pressure sensors. The piercing cartridge may further include an optical monitoring system including a laser generator configured to generate a sensing beam having a second frequency different from the first frequency, and one or more optical sensors configured to receive a reflection of the sensing beam via the fluid fiber assembly.

The probing cartridge may include a retractable fiber optic probe.

The closing cartridge may include a cap plunger configured to place a flexible cap at an interior portion of the tube, and a fusing laser configured to fuse a material to an exterior of the tube and a portion of the flexible cap.

According to further embodiments, a method for tube inspection is provided. The method includes positioning, on a tube to be inspected, a multi-purpose orbital tool having at least three process cartridges mounted thereon, the three process cartridges being rotatively selectable, providing a fluid to a first annular portion of the multi-purpose tool to cause expansion of the first annular portion to exert a force on a flexible annular portion of the multi-purpose tool, wherein the flexible annular portion forms a seal with the tube upon receiving the exerted force, rotating a frame of the multi-purpose tool about an axial axis of the tube such that a first cartridge of the at least three process cartridges is aligned with a processing location on the tube, processing the tube using the first cartridge, rotating the frame of the multi-purpose tool about the axial axis such that a second cartridge of the at least three process cartridges is aligned with the processing location without disturbing the seal, and performing an inspection of an interior of the tube via the second cartridge.

Processing using the first cartridge may include injecting a second fluid into a space between the first cartridge and the tube, and piercing the tube with a piercing laser beam, the piercing laser beam passing through the second fluid.

The method may further include rotating the frame of the multi-purpose tool about the axial axis such that a third cartridge of the at least three process cartridges is aligned with the processing location without disturbing the seal, injecting a purge gas into the space to purge the space, inserting a flexible cap into an interior of the tube at the processing location, and applying material to the processing location and the flexible cap using a welding or cladding process of the third cartridge.

The method may include monitoring the piercing using a sensing laser beam having a frequency different than a frequency of the piercing laser beam.

The method may include inserting a probe through a hole in the tube formed via the piercing, receiving information characterizing an interior of the tube, and retracting the probe from the hole.

Other aspects and advantages of the claimed subject matter will be apparent from the following description and the appended claims.

DETAILED DESCRIPTION

In one aspect, embodiments disclosed herein relate to a multi-functional apparatus for creating a small (e.g., micron-to-millimeter) opening in a conduit configured to carry fluids, using a liquid-assisted laser piercing method. The opening may act as a passage through which a flexible probe may be inserted, the flexible probe being configured to characterize the fluid in-situ and/or to evaluate interior sections of the conduit (e.g., via fiber-coupled attenuated total reflection spectrometry probe or fiber-coupled camera). Embodiments further relate to means for closing the opening after the measurement using a cladding-based or keyhole laser welding method.

Embodiments of the present disclosure may provide reduced operation cost for conduit inspection and maintenance, and provide means for rapidly characterizing fluids and their flow directly, all while enabling immediate measurement of fluid properties without disrupting production.

Figure 1:
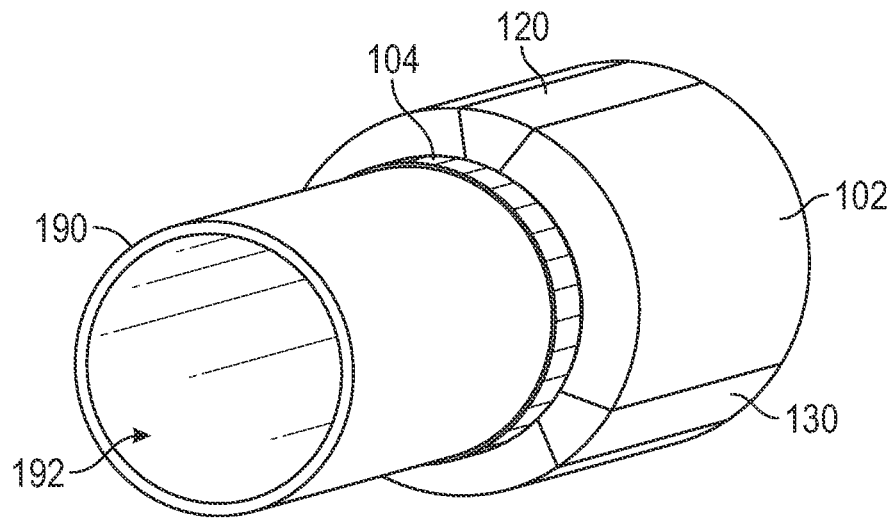
FIG. 1 shows an illustrative perspective view of a multi-functional apparatus according to embodiments of the present disclosure mounted on a conduit.
Figure 2:
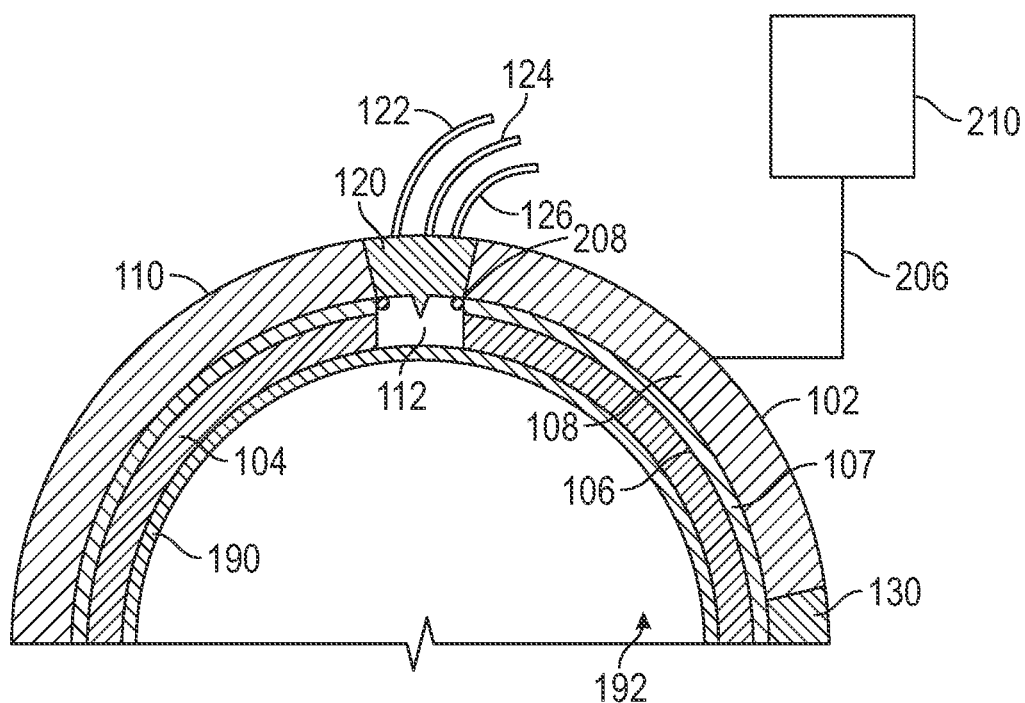
FIG. 2 shows a portion of the multi-functional apparatus of FIG. 1 in cross-section on the conduit.
Figure 3:
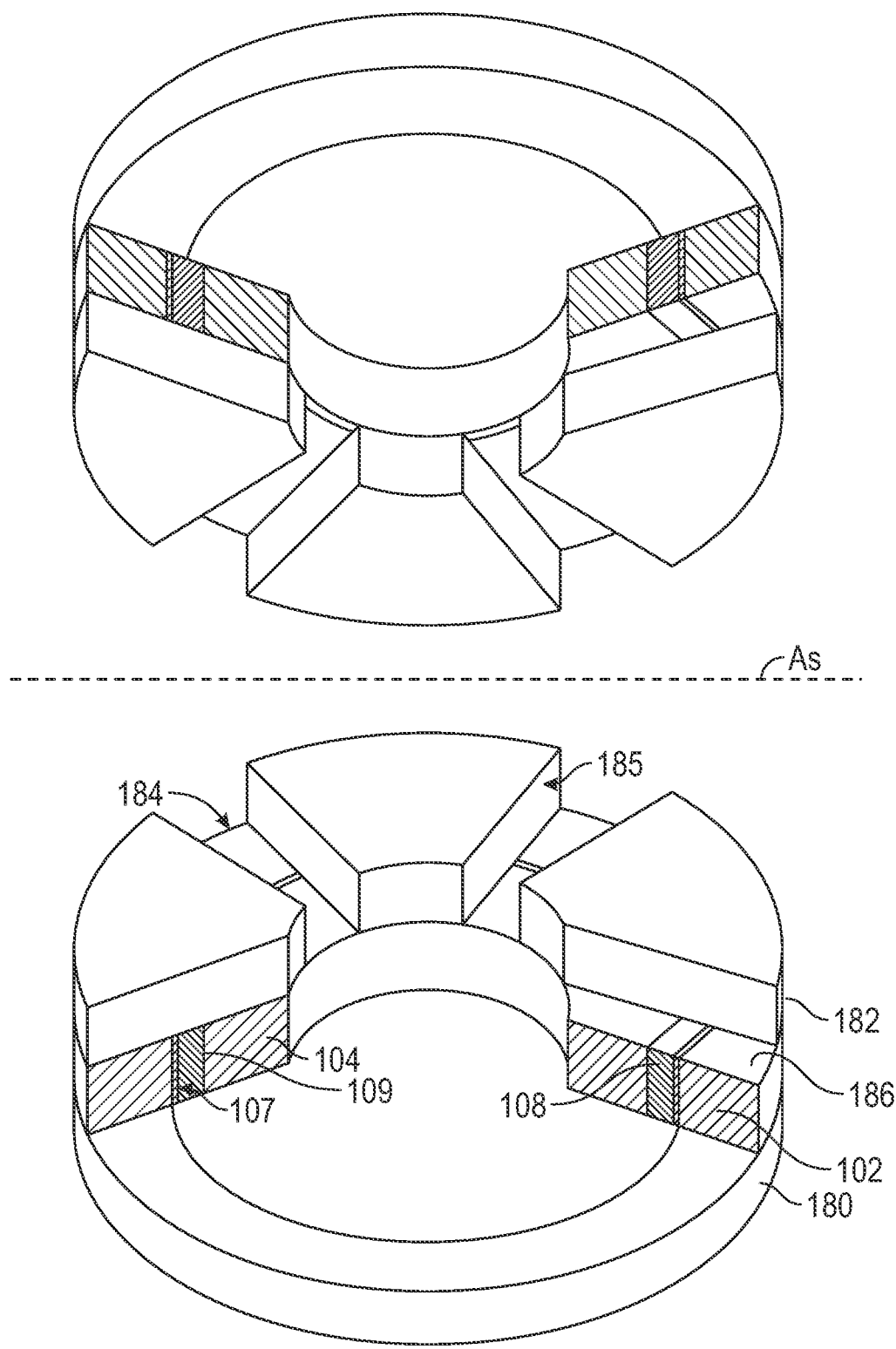
FIG. 3 shows an illustrative configuration of a multi-functional apparatus in a cut-away perspective view according to embodiments of the disclosure.

FIG. 1 shows an illustrative perspective view of a multi-functional apparatus 100 according to embodiments of the present disclosure mounted on a conduit 190, while FIG. 2 shows a portion of the multi-functional apparatus 100 of FIG. 1 in cross-section also mounted on the conduit 190. FIG. 3 shows an illustrative configuration of a multi-functional apparatus in a cut-away perspective view according to embodiments of the disclosure. FIGS. 1-3 will be referred to in combination in the following disclosure with regard to illustrative embodiments of the present disclosure.

According to embodiments of the present invention, the multi-functional apparatus 100 includes a frame 102, a buffer layer 106, a sealing layer 104, a rotational layer 107, and a process cartridge frame 182 mounted at least partially on a mounting surface 186 of the frame 102.

For purposes of the present disclosure the conduit 190 will be referred to interchangeably as a tube in the context of the petroleum production industry, however, this is not intended to be limiting. The conduit 190 may correspond to any conduit configured to carry a fluid via its interior 192, for example, production tubing (i.e., a tube) of a petroleum well, a petroleum pipeline, water piping, sewage piping, etc. As such conduit is known, a detailed description thereof will not be provided herein.

The sealing layer 104 is configured as an innermost annulus of the multi-functional tool 100 and is configured to form a seal with an outer surface of the conduit 190 during processing. The sealing layer 104 may be configured to extend around a periphery of the conduit so as to seal a processing area around an area of the conduit 190, e.g., such that a process cartridge 120, 130, 140 installed in the multi-functional tool may access the conduit 190.

To facilitate formation of a seal with the conduit 190, the sealing layer 104 may comprise a deformable material such as, for example, a thermoset elastomer, a shape memory polymer (SMP), or a thermoplastic elastomer (TPE). According to some embodiments, the sealing layer 104 may comprise, for example, crystalline trans-polyisoprene, an SMP (shape memory polymer) providing desirable sealing qualities while also returning to an original shape (e.g., using an electrical signal) thus enabling quick release from the conduit 190.

The material implemented for the sealing layer 104 may further be chosen based on the various processes that the multi-functional tool may be intended to carry out. For example, the material implemented for the sealing layer 104 may have a low thermal expansion (<0.01 mm/K) and a low thermal conductivity (0.03-0.1 W/mK) for processes involving heating (e.g., laser-based processes).

According to some embodiments, the sealing layer 104 may be configured such that deformation of the material is directed to propagate substantially, and, in some cases, exclusively, along the radial direction. For example, by implementing anisotropic materials such as composites or plastics with aligned chains in an elastomeric matrix, and according to some embodiments, embedded with woven reinforcements (e.g., woven synthetic fibers, carbon fibers, etc.), and/or anisotropic hydrogels materials with cellular micro and/or nanostructures, or combinations thereof, the deformation may be controlled to be restricted largely to the radial direction. The materials mentioned herein for sealing layer 104 are intended as illustrative only, and any suitable material capable of producing a seal with the conduit 190 may be implemented for the sealing layer 104.

The sealing layer 104 may be configured to remain static (i.e., not move) relative to the conduit 190 during rotation of the annular frame 102. In other words, upon establishment of a seal between the conduit 190 and the sealing layer 104, the sealing layer 104 may remain fixed until termination of processing and removal of the multi-functional tool 100.

The sealing layer 104 may be configured to provide insulation from the environment external to the process as well as from process-based materials escaping to the surrounding environment. For example, the sealing layer 104 may form a hermetic seal with the conduit 190 thereby substantially, or completely, preventing intrusion of external gasses, dust, and other contaminants into the process area 112 (also referred to as working area 112) sealed by the sealing layer 104. Further, where the processing involves the use of materials inside the seal, such as, for example, during a fluid coupled lasing process, the sealing layer 104 may substantially, or even completely, prevent any of the material from escaping the processing area 112 based on the seal formed with the conduit 190 (e.g., a hermetic seal).

According to some embodiments, the sealing layer 104 may be built on and/or joined with an expandable substrate 109 forming a base of the sealing layer 104. The substrate 109 may comprise or be configured as a bladder enabling filling of the substrate 109 with a fluid (e.g., air) to cause filling of the substrate 109 to enable, for example, a force (e.g., radial force) to be applied to the sealing layer 104. For example, upon inflation of the substrate 109 with air, a radial force may be applied to the sealing layer 104, thereby forcing the deformable material radially towards the conduit. Such a force may facilitate conformance of the sealing layer 104 to the shape of the conduit 190.

When provided, the substrate 109 may be fabricated of any suitable material enabling formation of a bladder for filling (expansion) and draining (contraction) of a fluid for generating a force in the radial direction, while also allow for joining (e.g., via an adhesive) with the sealing layer 104. For example, the substrate may be formed of a polyethylene, rubber, and SMPs. According to some embodiments, the substrate 109 may be comprised by the buffer layer 106.

The buffer layer 106 is positioned radially inward of and concentrically with the annular frame 102 and radially outward and also concentrically with the sealing layer 104. In other words, the buffer layer 106 is configured as an annulus placed between the frame 102 and the sealing layer 104 such that forces generating during rotation of the frame 102, among other things, may be absorbed by the buffer layer 106 instead of being transferred to the sealing layer 104.

The buffer layer 106 may comprise any suitable material or combination of materials for providing padding and or insulation between the annular frame 102 and the sealing layer 104, while enabling rotation of the annular frame 102 without movement of the sealing layer 104. For example, the buffer layer 106 may include a relatively rigid material (relative to the sealing layer 104) such as, for example, a high-density polyethylene, or other similar material designed to withstand loads (e.g., rotational loads) introduced during processing and/or rotation of the annular frame 102.

The buffer layer 106 may include and/or be in contact with the rotational layer 107. The rotational layer 107 is positioned between the annular frame 102 and the buffer layer 106 to facilitate rotation of the annular frame 102 about the buffer layer 106. For example, the rotational layer 107 may include one or more of a bearing set (e.g., ball bearings) and a fluid joint (e.g., formed by a viscous oil) configured to facilitate the rotation of the annular frame 102 while allowing the buffer layer 106 and sealing layer 104 in place, i.e., static. According to some embodiments, an annular bearing set may be implemented as the rotational layer 107 and may be positioned concentrically between the buffer layer 106 and the annular frame 102.

The buffer layer 106 may include one or more transport lines 206 configured to carry process components from a source 210 to the processing location 112 on the conduit 190. For example, the transport lines 206 may be configured to carry an inert gas (e.g., argon, neon, etc.) as a purging fluid and deliver the inert gas to a nozzle 208 configured to purge a working area 112 between the conduit 190 and one or more of the process cartridges 120, 130, 140. Alternatively, or in addition, one or more of the transport lines 206 provided within the buffer layer 106 may be configured to carry a fluid for inflating the substrate 109 as described above for providing force to the sealing layer 104, among other things.

The buffer layer 106 may further comprise a window (not shown) (e.g., a movable/retractable window) configured to further isolate the processing area 10 and may be useful during the laser piercing and welding operations. For example, a window may be positioned perpendicular to a direction of propagation of a process laser beam and may comprise sapphire, diamond, infra-red flex series (IRFS) materials, transparent aluminum (e.g., ALON), or a chalcogenide glass. The retractable window may aid in cases where damage is identified and/or an operation may require direct exposure. Such windows may also prevent debris from entering a process cartridge (e.g., the laser head.)

According to some embodiments, sealing layer 104 may be in direct contact with, and, in some embodiments, adhered directly to the buffer layer 106. Alternatively, the sealing layer may be adhered to the substrate 109 and the substrate 109 adhered to the buffer layer 106, for example.

The annular frame 102 is configured for engagement with a rotor and/or an orbital element mount 180. The annular frame 102 is positioned at an outermost portion of the multi-functional tool and is concentric with the sealing layer 104 and the buffer layer 106. As noted above, the annular frame 102 is configured to rotated about the buffer layer 106 and sealing layer 104, without causing rotation of the buffer layer 106 or sealing layer 104.

The annular frame 102 includes a mounting surface 186 on a face of the annular frame 102 where an outer seal cap 182 may be mounted, thereby creating a receiver 184 for mounting of process cartridges 120, 130, 140. For example, the outer seal cap 182 may include a plurality of voids/slots spaced angularly about the periphery of the outer seal cap 182, enabling insertion of a process cartridge 120, 130, 140 into each slot.

The annular frame 102 may be fabricated from a rigid material (e.g., metal, composite, plastic) and may be configured such that forces applied to the annular frame 102 (e.g., by rotor 180) cause a rotation thereof about the axial axis of the conduit 190. For example, the annular frame 102 may include mechanical features, e.g., gear teeth, belt cogs, etc. configured to receive mechanical force and to translate the mechanical force into rotation of the annular frame 102. Thus, the annular frame 102 may be configured to be engaged by a rotor (not shown) providing force to cause the rotation. Such a rotor may be electromagnetic, hydraulic, or mechanic, and the rotation imparted to the annular frame 102 may be achieved by, for example, mechanical engagement (e.g., via the gear teeth), electromagnetic, or other suitable methods. Alternatively, or in addition, the annular frame may be affixed to the rotor 180, e.g., via fasteners, quick-connect mount, welding, etc., and rotational force transferred to the annular frame 102 via the engagement between the rotor 180 and the annular frame 102.

The annular frame 102 is configured to move independently of the buffer layer 106 and to enable positioning of pre-installed process cartridges 120, 130, 140 at the process location 112 via rotation. According to some embodiments, an off-the-shelf rotary mount may be implemented for the annular frame 102. Alternatively, the annular frame 102 may be custom fabricated explicitly for a given size and configuration, for example, based on the conduit to be processed and the processing to be performed.

The annular frame 102 may include additional features enabling mounting, adjustment, and removal of the multi-functional tool 100 on and from a conduit 190. For example, the annular frame 102 may include any suitable arrangement of fasteners and/or joints enabling opening of the annular frame and the multi-functional tool 100 for mounting at a position along the conduit 190.

The annular frame 102 includes at least three slots for mounting of process cartridges 120, 130, and 140, selection of a particular cartridge for use being performed via rotation of the annular frame 102 to the process area 112. For example, the slots/receivers 184 formed within the sealing cap 182 may be implemented to mount the process cartridges 120, 130, 140 on the annular frame 102.

Process cartridges for a particular implementation may include a piercing cartridge 120, a probing cartridge 130, and a closing cartridge 140. Each of the slots may include a locking mechanism 185, for example, one or more spring loaded and releasable pins, hooks, or other suitable mechanism configured to secure a process cartridge 120, 130, 140 in place within a receiver 184 on the annular frame 102.

Each process cartridge 120, 130, 140 may be operated independently of other installed process cartridges, and configured to include respective electronics, optomechanical, optical, computational, and telemetry/sensing systems for carrying out functionality intended to be performed by the respective cartridge. For example, as shown at FIG. 2, the piercing cartridge 120 may include electrical cables 122 (e.g., power cables, control cables, etc.), optical cables 124 (e.g., laser transmitting fiber optics), and processing fluid cables 126 (e.g., for providing a fluid to a fluid fiber in the processing area 112), as well as circuitry (e.g., microprocessors, circuits, etc.) configured for performing a laser piercing process.

In addition, one or more of the process cartridges 120, 130, 140, may include a purging nozzle to enable, for example, purging of the working area 112 with an inert gas, maintaining a pressure balance, etc. According to some embodiments, each and every process cartridge 120, 130, 140 may include means for purging the working area 112, e.g., via a purging nozzle or other gas introduction means.

Figure 4A:
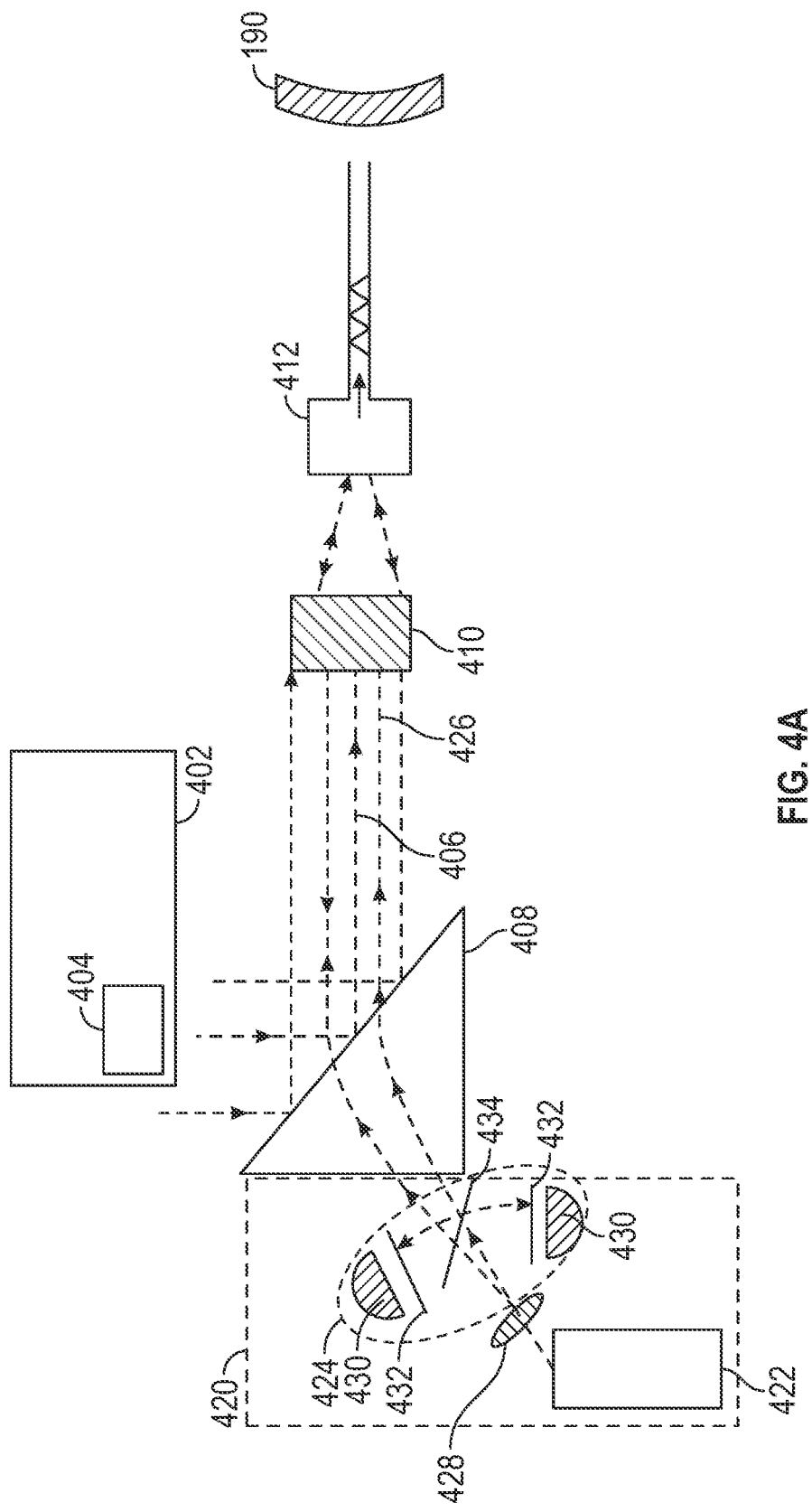
FIG. 4A is a schematic of an illustrative laser piercing cartridge that may be implemented with the multi-functional tool according to embodiments of the present disclosure.

FIG. 4A is a schematic of an illustrative laser piercing cartridge 120 that may be implemented with the multi-functional tool 100 according to embodiments of the present disclosure. According to some embodiments, the piercing cartridge 120 comprises a laser piercing system configured to pierce a probing orifice 456 (e.g., having a diameter ranging between 10 μm and 1 cm) through the conduit 190 using a process beam 406 (e.g., a high-power laser beam) having a frequency and wavelength, (e.g., 330-360 nm, 400-450 nm, 980-1100 nm, 2500-3000 nm, and 10,000 nm.) According to some embodiments, a pulsed high-energy laser may be implemented for at least some of the laser processing.

According to embodiments of the disclosure, a laser source 402 is configured to is provided the process beam 406 to a collimator 404 such that the process beam 406 subsequently impinges on a prism 408. The prism 408 is configured to modify a directional vector of the process beam 406, for example, to redirect the process beam 406 at a desired angle (e.g., ninety degrees) toward a lens set 410. The lens set 410 is configured to focus the process beam 406 into a fiber fluid assembly 412 and onto a region along the outer surface of the output nozzle of the piercing cartridge 120.

The fiber fluid assembly 412 may be configured as a free-space coupling using a liquid as the coupler. The liquid for the fluid fiber assembly 412 may be chosen to be transparent or semi-transparent at the frequency of the process beam 406, as well as a frequency of a sensing beam 426 of an optical monitoring system 420, to be discussed below. For example, a semi-transparent fluid at the frequency of the process beam 406 may be used to ensure the process beam 406 is absorbed before reaching a given point within the conduit 190 during a piercing operation, while the sensing beam 426 is permitted to freely pass and reflect via the fluid. According to such an example, and for near-infrared process beams, liquids may be selected from among halocarbons, fluor-based liquids, or other non-hydrogenated liquids, as desired.

The fluid fiber assembly 412 may include a fluid reservoir, a fluid pump, a jet-nozzle (e.g., a laminar jet nozzle), and one or more pressure sensors (e.g., solid-state pressure sensors) located, for example, inside the fluid chamber and the nozzle, among other things.

According to some embodiments, the piercing process cartridge 120 may include an optical monitoring system 420. The optical monitoring system 420 may include a separate laser generator 422 for providing a sensing beam 426 at a desired frequency sufficiently different from that of the processing laser beam 406 and wavelength (e.g., 1000-1100 nm) configured for providing information related to the piercing process. The frequency for the sensing beam 426 may be selected so as not to overlap with a frequency of the processing beam 406, for example.

The optical monitoring system 420 may include one or more optical sensors 430 within an optical sensor assembly 424 that is mounted, for example, at a rear portion of the prism 408, or other suitable location. The optical sensor assembly 424 is configured to receive information, e.g., via back-scattered light from the process beam 406 and the sensing beam 426, and to use the information to control the piercing process. Information obtained via the back-scattered light may include, for example, a frequency and a time-of-arrival (ToA), among other things, and may be expanded using correlation techniques of signal analysis (e.g., autocorrelation).

The optical monitoring system 420 may include an optical analysis tool and may implement optics to direct and filter the process beam 406 and sensing beam 426 as desired. For example, a sensing laser beam 426 operating at a frequency not overlapping the frequency range of the process beam 406 may be used to probe the piercing process carried out by the piercing cartridge 120. The sensing beam 426 may propagate through an optical collimator 428, a set of interference filters 432 (e.g., selected to screen back-reflections from the process beam), a dichroic beam splitter 434, and the right-angle prism 408 to join the process beam 406 following the same path to the conduit 190.

According to some embodiments, a propagation angle of the sensing beam 426 may be configured such that the diffracted beam is colinear to the process beam 406 as it propagates to the fluid assembly 412.

Two photo-multiplying sensors 430 (e.g., CCD and/or CMOS) may be fitted with the interference filters 432 positioned at opposite arms of the dichroic beam splitter 434 to characterize the input vs back-scattered components of the sensing beam 426. A secondary dichroic beam splitter (not shown) may be provided in the return path (back-scattered path) to provide information regarding the process beam 426.

According to some embodiments, additional neutral density and interference filters (not shown) may be added to, for example, reduce the intensity of the back-scattered process beam, among other things.

Figure 4B:
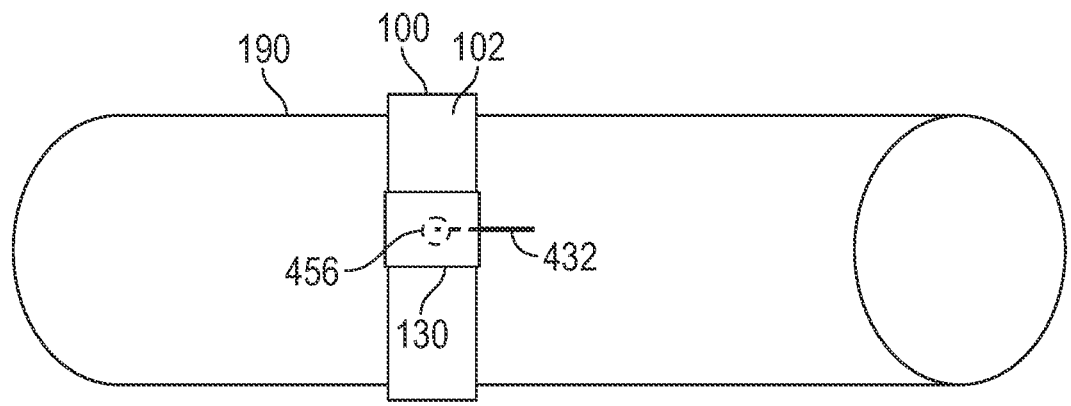
FIG. 4B shows an illustrative probing cartridge operating according to embodiments of the present disclosure.

FIG. 4B shows an illustrative probing cartridge 130 operating according to embodiments of the present disclosure. The probing cartridge 130 may be configured to introduce a probe 432 into the conduit 190 via the probing orifice 456, the probe 432 being configured to provide information (e.g., flow rate, flow characterization, wall condition, etc.) related to an interior 192 of the conduit 190. For example, the probe 432 may comprise a flexible fiber optic and may be extendable/retractable (e.g., via a servo operated spool) such that the probe 432 may be extended into the conduit 190 at a desired distance (e.g., between 0.1 and 20 cm). Such a probe 432 may then be wound back onto the spool (not shown) to retract the probe 432 from the probing orifice 456 configured to provide information related to a condition of the conduit interior 192.

A sensing head (not shown) of the probe 432 may be designed in any suitable manner for providing the desired information from within the interior 192. For example, a retractable, fiber-coupled attenuated total internal reflection Fourier transform infrared spectrometer (ATR-FTIR) may be implemented at the distal end of the probe 432.

Figure 5:
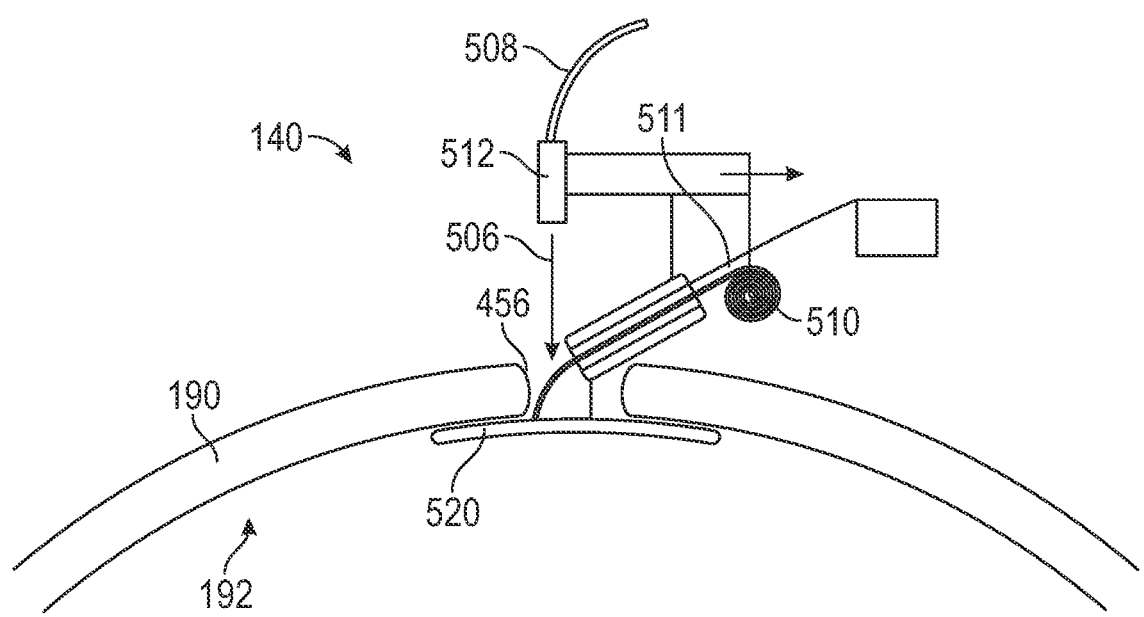
FIG. 5 is a schematic of an illustrative closing cartridge that may be implemented with the multi-functional tool according to embodiments of the present disclosure.

FIG. 5 is a schematic of an illustrative closing cartridge 140 that may be implemented with the multi-functional tool 100 according to embodiments of the present disclosure. The closing cartridge may be configured to close the probing orifice 456 via a welding and/or a cladding process following removal of the probe 452. For example, the closing cartridge 140 may be configured to implement a wire and/or powder laser cladding process to deposit a closing material in and around the probing orifice 456 on the conduit 190, thereby closing the probing orifice 456.

According to some embodiments, the closing cartridge 140 may include a laser supply (not shown) configured to generate a laser beam 506 carried by a fiber optic 508, a material supply 510, and a cap plunger 512. The laser supply may be configured to provide a laser beam 506 of suitable power and intensity to fuse or otherwise melt material 511 provided by the material supply 510 (e.g., a wire of an alloy metal) on the conduit 190. For example, the laser supply may transmit a high-powered laser beam 506 through the fiber optic 508 such that the laser beam 506 impinges on a wire (e.g., a heated allow wire) positioned near the probing orifice 456 to melt the wire material and close the orifice 456.

According to some embodiments, prior to closing of the probing orifice 456, a collapsible closing cap 520 may be inserted into the probing orifice 456, via, for example the cap plunger 512. The collapsible closing cap 520 may comprise a soft alloy such that insertion into the probing orifice 456 prior to the welding/cladding process may be performed using the plunger 512. For example, the closing cap 520 may be deformed to enable passage through the orifice 456, pressed through to the interior 192 of the conduit 190 by the cap plunger 512, and held against an inner wall (e.g., via the cap plunger 512) of the conduit 190 to serve as plug. By providing the closing cap 520 entry of molten cladding/welding material to the conduit interior may be substantially prevented.

Additional modifications may be made to the closing cartridge 140. For example, the cartridge may be fitted with a scanner (not shown) to enable tracking of the process. The scanner may enable movement of the cladding/welding process as desired to obtain a quality closing weld. Additionally, the closing cartridge may be provided with one or more purge nozzles (not shown) configured to purge the process area 112 of any contaminants remaining from previous processing, among other things.

Figure 6:
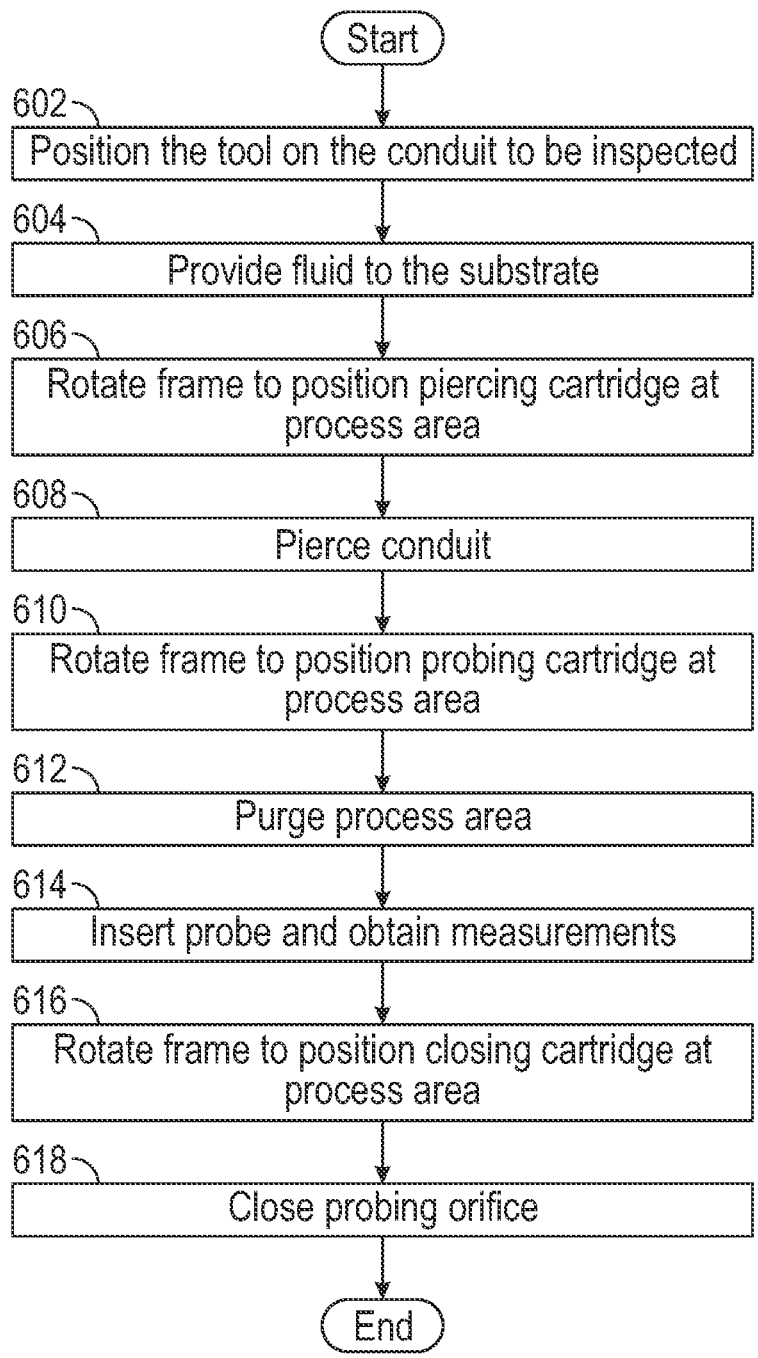
FIG. 6 is a flowchart highlighting an illustrative method for using the multi-functional apparatus according to embodiments of the present disclosure.

FIG. 6 is a flowchart highlighting an illustrative method for using the multi-functional tool 100 according to embodiments of the present disclosure. For performing multi-functional processing on a conduit 190 a multi-functional tool 100 as described above my first be positioned on the conduit 190 (step 602). For example, the multi-functional tool 100 may be disassembled and/or opened via fasteners and hinges provided on the annular frame 102 and mounted on to the conduit 190.

A fluid may then be provided to the substrate 109 to cause expansion of the substrate 109 to exert force on the sealing layer 104 against the conduit 190 (step 604). For example, a supply of compressed air may be provided to a bladder of the substrate 109 to cause inflation thereof thereby causing sealing layer 104 to seal against the conduit 190.

Once the seal has been achieved, the annular frame 102 may be rotated to select a process cartridge 120, 130, 140, for beginning the processing of the conduit 190 (step 606). For example, the multi-functional tool 100 may have three process cartridges installed, a piercing cartridge 120, a probing cartridge 130, and a closing cartridge 140. To being processing after sealing, the annular frame 102 may be rotated such that the piercing cartridge 120 is positioned at the processing area 112 of the conduit 190. Based on the configuration described above, rotating of the annular frame 102 may be performed without disturbing the seal.

The piercing cartridge 120 may carry out piercing of the conduit 190 (step 608). For example, the piercing cartridge 120 may purge the process area 112 using an injection of inert gas, and then subsequently inject a fluid into the process area 112, the fluid being configured as the fluid fiber assembly 412. The processing beam 406 may then be initiated to cause piercing of the conduit 190 to form the probing orifice 456.

During the piercing process, the optical monitoring system 420 may monitor the process and cause the piercing cartridge to adapt the process based on the monitoring. For example, where the optical monitoring system 420 determines that the processing beam 406 is insufficiently progressing through a wall of the conduit 190, the optical monitoring system 420 may cause adjustments to be made in the processing beam 406 and the fluid fiber assembly 412, for example.

Once the probing orifice 456 has been pierced by the piercing cartridge 120, then the annular frame 102 may be rotated to place the probing cartridge 130 at the processing area 112 (step 610). The probing cartridge 130 may purge the process area 112 with a gas from a purge nozzle associated with the probing cartridge (step 612), for example, to clear any remaining fluid from the fiber fluid fiber assembly 412 utilized during the piercing process.

The probe 432 may then be inserted via the probing orifice 456 and desired information obtained from within the conduit 190 (step 614). For example, measurements related to a flow rate, flow characteristics, condition of the interior of the conduit 190, etc. may be obtained via the probe 432.

Once the desired information has been obtained via the probe 432, the probe may be retracted from the conduit 190 and the annular frame rotated such that the closing cartridge is located at the process area 112 (step 616).

The closing cartridge 130 may then perform operations to close the probing orifice 456 as described above (step 618). For example, the closing cartridge 140 may purge the process area using an inert gas via a nozzle supplied on the closing cartridge 140, position process area 112 by injecting a gas therein. A cap 520 may be inserted through the probing orifice 456 and held in place at the interior portion of the orifice 456. The closing laser 506 may then melt the material 511 to fill the orifice 456 and secure the cap 520 in place within the conduit 190.

According to some embodiments, a controller 700 may be provided to, for example, adapt processing for a particular cartridge, automatically/robotically control functionality of the multi-functional tool 100, etc. Additionally, each process cartridge 120, 130, 140 installed on the multi-functional tool 100 may include a controller configured to carry out the designated operation.

Figure 7:
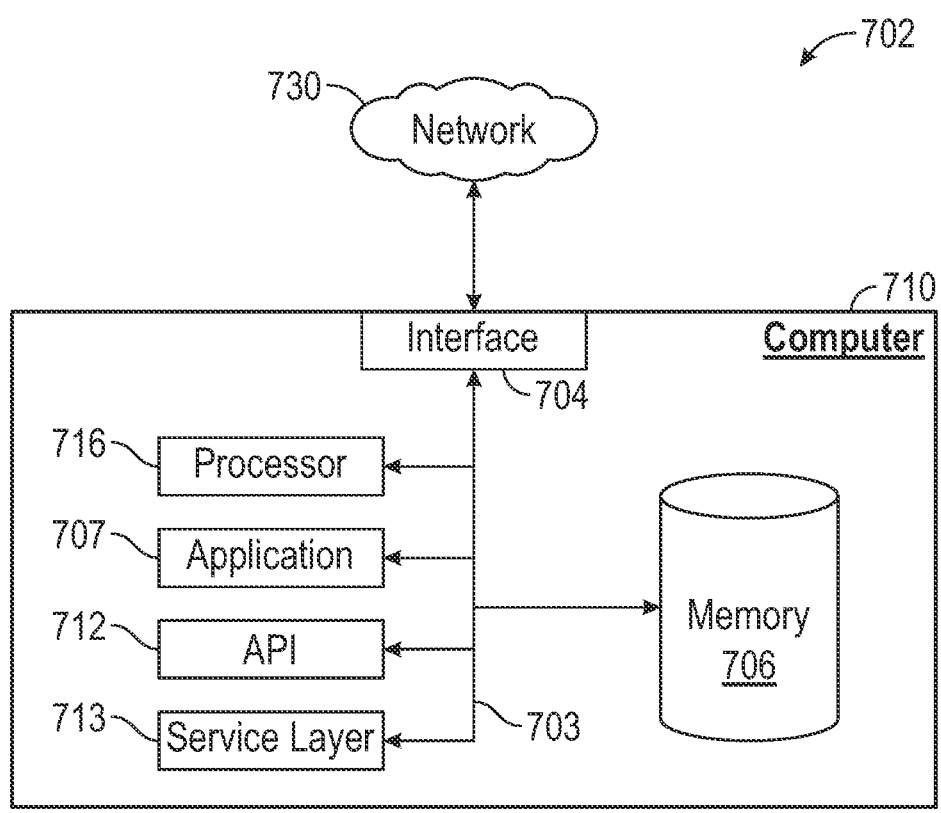
FIG. 7 shows a computer system in accordance with one or more embodiments.

FIG. 7 shows a controller 700 in accordance with one or more embodiments that may be implemented, for example, to provide robotic control of the multi-functional tool 100, to control processing, etc. Specifically, FIG. 7 shows a block diagram of a computer 702 system used to provide computational functionalities associated with described algorithms, methods, functions, processes, flows, and procedures as described in the instant disclosure, according to an implementation.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer 702 may include a computer that includes an input device, such as a keypad, keyboard, touch screen, or other device that can accept user information, and an output device that conveys information associated with the operation of the computer 702, including digital data, visual, or audio information 104, 106 (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713.

The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format.

While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730.

Generally, the interface 704 includes logic encoded in software or hardware (or a combination of software and hardware) and operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes at least one computer processor 705. Although illustrated as a single computer processor 705 in FIG. 7, two or more processors may be used according to particular needs, desires, or particular implementations of the computer 702. Generally, the computer processor 705 executes instructions and manipulates data to perform the operations of the computer 702 and any algorithms, methods, functions, processes, flows, and procedures as described in the instant disclosure.

The computer 702 also includes a non-transitory computer 702 readable medium, or a memory 706, that holds data for the computer 702 or other components (or a combination of both) that can be connected to the network 730. For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A device for probing an interior of a tube, comprising:
   an annular frame configured for engagement with a rotor or an orbital element mount, the annular frame presenting a mounting surface on a face of the annular frame;
   an annular buffer layer positioned radially inward of and concentrically with the annular frame;
   a flexible annular sealing layer joined with the annular buffer layer and positioned radially inward of and concentrically with the annular buffer layer,
   wherein the flexible annular sealing layer is configured to form a seal with the tube;
   a rotational layer positioned between the annular frame and the annular buffer layer enabling rotation of the annular frame about the annular buffer layer; and
   a process cartridge frame mounted on the mounting surface and comprising three or more process cartridge openings,
   wherein each of the three or more process cartridge openings is configured to receive a process cartridge,
   wherein each process cartridge is rotatively selectable via rotation of the annular frame.

2. The device of claim 1, wherein the flexible annular sealing member comprises an expandable substrate forming a base of the flexible annular sealing layer,
   wherein the base is joined with the annular buffer layer, and
   wherein the expandable substrate is configured to be expanded to cause deformation of the flexible annular sealing layer against a surface of the tube.

3. The device of claim 1, further comprising:
   a first process cartridge corresponding to a piercing cartridge mounted in a first process cartridge opening of the three or more process cartridge openings;
   a second process cartridge corresponding to a probing cartridge mounted in second process cartridge opening of the three or more process cartridge openings; and
   a third process cartridge corresponding to a closing cartridge mounted in a third process cartridge opening of the three or more process cartridge openings.

4. The device of claim 3, wherein each of the first, second, and third process cartridges is operable independently of another of the first, second, and third process cartridges.

5. The device of claim 3, wherein the piercing cartridge comprises a laser piercing tool configured to pierce the tube to produce a probing orifice,
   wherein the probing cartridge is configured to introduce a probe into the tube via the probing orifice,
   wherein the probe is configured to provide information related to an interior of the tube, and
   wherein the closing cartridge is configured to close the probing orifice via a welding or a cladding process after removal of the probe.

6. The device of claim 5, further comprising a gas supply and at least one nozzle configured to purge a working area between the tube and one or more of the first, second, and third process cartridges.

7. The device of claim 3, wherein the piercing cartridge comprises:
   a fluid fiber assembly configured to transmit a processing beam having a first frequency to an exterior surface of the tube,
   wherein the fluid fiber assembly comprises a fluid reservoir, a fluid pump, a nozzle, and one or more pressure sensors; and
   an optical monitoring system comprising:
      a laser generator configured to generate a sensing beam having a second frequency different from the first frequency; and
      one or more optical sensors configured to receive a reflection of the sensing beam via the fluid fiber assembly.

8. The device of claim 3, wherein the probing cartridge comprises a retractable fiber optic probe.

9. The device of claim 3, wherein the closing cartridge comprises:
   a cap plunger configured to place a flexible cap at an interior portion of the tube; and
   a fusing laser configured to fuse a material to an exterior of the tube and a portion of the flexible cap.

10. The device of claim 1, further comprising a controller configured to control one or more of:

rotation of the annular frame;
selection of a process cartridge; and
operation of the selected process cartridge.

11. The device of claim 1, wherein the flexible annular sealing layer comprises a material selected from among a high-temperature elastomer, a flexible thermoplastic, and a shape memory polymer, the material having a thermal expansion less than 0.01 mm/degree K and a thermal conductivity between 0.03 and 0.1 W/mK.

12. The device of claim 11, wherein the material comprises an anisotropic composite or plastic, the material being embedded with fiber reinforcement.

13. The device of claim 1, wherein the rotation layer comprises one or more of a bearing set and a fluid joint.

14. The device of claim 1, wherein the buffer layer comprises a rigid material configured to isolate rotation of the annular frame from the flexible sealing layer.

15. The device of claim 1, wherein the buffer layer comprises one or more fluid lines configured to carry a fluid to an output nozzle associated with a process cartridge opening.

16. A method for tube inspection, comprising:
    positioning, on a tube to be inspected, a multi-purpose orbital tool having at least three process cartridges mounted thereon, the three process cartridges being rotatively selectable;
    providing a fluid to a first annular portion of the multi-purpose tool to cause expansion of the first annular portion to exert a force on a flexible annular portion of the multi-purpose tool,
    wherein the flexible annular portion forms a seal with the tube upon receiving the exerted force;
    rotating a frame of the multi-purpose tool about an axial axis of the tube such that a first cartridge of the at least three process cartridges is aligned with a processing location on the tube;
    processing the tube using the first cartridge;
    rotating the frame of the multi-purpose tool about the axial axis such that a second cartridge of the at least three process cartridges is aligned with the processing location without disturbing the seal; and
    performing an inspection of an interior of the tube via the second cartridge.

17. The method of claim 16, wherein the processing using the first cartridge comprises:
    injecting a second fluid into a space between the first cartridge and the tube; and
    piercing the tube with a piercing laser beam, the piercing laser beam passing through the second fluid.

18. The method of claim 17, further comprising:
    rotating the frame of the multi-purpose tool about the axial axis such that a third cartridge of the at least three process cartridges is aligned with the processing location without disturbing the seal;
    injecting a purge gas into the space to purge the space;
    inserting a flexible cap into an interior of the tube at the processing location; and
    applying material to the processing location and the flexible cap using a welding or cladding process of the third cartridge.

19. The method of claim 17, further comprising, monitoring the piercing using a sensing laser beam having a frequency different than a frequency of the piercing laser beam.

20. The method of claim 17, wherein the inspection comprises:
    inserting a probe through a hole in the tube formed via the piercing;
    receiving information characterizing an interior of the tube; and
    retracting the probe from the hole.

* * * * *